United States Patent
Kramer et al.

(10) Patent No.: US 12,509,580 B2
(45) Date of Patent: Dec. 30, 2025

(54) POLYMER CONTAINING SILANE GROUPS

(71) Applicant: SIKA TECHNOLOGY AG, Baar (CH)

(72) Inventors: Andreas Kramer, Zürich (CH); Marcel Oertli, Winterthur (CH); Ursula Stadelmann, Zürich (CH); Sven Reimann, Zürich (CH)

(73) Assignee: SIKA TECHNOLOGY AG, Baar (CH)

( * ) Notice: Subject to any disclaimer, the term of this patent is extended or adjusted under 35 U.S.C. 154(b) by 741 days.

(21) Appl. No.: 17/792,876

(22) PCT Filed: Feb. 3, 2021

(86) PCT No.: PCT/EP2021/052559
§ 371 (c)(1),
(2) Date: Jul. 14, 2022

(87) PCT Pub. No.: WO2021/160492
PCT Pub. Date: Aug. 19, 2021

(65) Prior Publication Data
US 2023/0072857 A1 Mar. 9, 2023

(30) Foreign Application Priority Data
Feb. 10, 2020 (EP) .................................... 20156460

(51) Int. Cl.
*C08L 75/08* (2006.01)

(52) U.S. Cl.
CPC .................................... *C08L 75/08* (2013.01)

(58) Field of Classification Search
CPC .... C08G 18/755; C08G 18/10; C08G 18/289; C08G 18/4825; C08G 18/4841; C08G 18/7671; C09D 175/08; C09J 175/08; C09K 3/1021
See application file for complete search history.

(56) References Cited

U.S. PATENT DOCUMENTS

| | | | |
|---|---|---|---|
| 6,545,087 B1 | 4/2003 | Schmalstieg et al. | |
| 6,884,904 B2 | 4/2005 | Smith et al. | |
| 9,790,315 B2 | 10/2017 | Kramer et al. | |
| 2006/0205859 A1 | 9/2006 | Bachon et al. | |
| 2014/0255373 A1 | 9/2014 | Schonberger | |
| 2017/0292050 A1 * | 10/2017 | Burckhardt | C08K 5/548 |
| 2019/0169476 A1 * | 6/2019 | Mennecke | C08G 18/4825 |

FOREIGN PATENT DOCUMENTS

| | | | |
|---|---|---|---|
| EP | 1 553 118 B1 | 11/2006 | |
| EP | 1 237 967 B1 | 1/2007 | |
| EP | 1746117 A1 * | 1/2007 | C08G 18/10 |
| JP | H02-1718 A | 1/1990 | |
| JP | H10-176028 A | 6/1998 | |
| JP | 2005-523958 A | 8/2005 | |
| JP | 2007-511627 A | 5/2007 | |
| JP | 2015-501333 A | 1/2015 | |
| WO | 03/091306 A1 | 11/2003 | |
| WO | 2017/056903 A1 | 4/2017 | |
| WO | WO-2024012827 A1 * | 1/2024 | C08G 16/0231 |

OTHER PUBLICATIONS

English Machine Translation of EP 1746117 A1 (Year: None).*
Aug. 11, 2022, International Preliminary Report on Patentability issued in International Application No. PCT/EP2021/052559.
May 3, 2021, Search Report issued in International Patent Application No. PCT/EP2021/052559.

* cited by examiner

*Primary Examiner* — Randy P Gulakowski
*Assistant Examiner* — Holley Grace Hester
(74) *Attorney, Agent, or Firm* — Oliff PLC

(57) ABSTRACT

A silane group-containing polymer obtained from reacting (i) an isocyanate group-containing polymer having an NCO content in the range of 0.3 to 4% by weight and a monomeric diisocyanate content of at most 0.3 wt. % obtained from the reaction of at least one monomeric diisocyanate with at least one polyether polyol in a molar NCO/OH ratio of at least 3/1 and subsequent removal of a major part of the unreacted monomeric diisocyanates by means of a suitable separation process, (ii) with at least one amino-, mercapto- or hydroxysilane in a stoichiometric ratio of at least 1 mole of amino-, mercapto- or hydroxysilane per mole equivalent of isocyanate groups.

15 Claims, No Drawings

POLYMER CONTAINING SILANE GROUPS

TECHNICAL FIELD

The invention relates to polymers containing silane groups and to the use thereof in curable compositions, especially moisture-curing adhesives, sealants or coatings.

STATE OF THE ART

Polymers containing silane groups, also called silane-functional or silane-terminated polymers, are known as a constituent of moisture-curing adhesives, sealants or coatings.

There are various known routes to polymers containing silane groups. There are firstly what are called the MS polymers that are obtained by hydrosilylation of allyl ether-terminated polyether polyols; there are also what are called the SPUR polymers that are obtained from the reaction of isocyanatosilanes with polyether polyols; and there are finally polymers containing silane groups from the reaction of amino- or hydroxysilanes with polymers containing isocyanate groups from the reaction of polyether polyols and monomeric diisocyanates.

The latter are of the greatest interest in respect of mechanical properties, especially good strength coupled with high extensibility. The polymers containing isocyanate groups that serve as starting materials for preparation thereof are prepared by reacting monomeric diisocyanates and polyether diols in an NCO/OH ratio of about 2/1, described, for example, in U.S. Pat. No. 6,545,087 or 9,790,315. They contain considerable amounts of monomeric diisocyanate and chain-extended polymers in which two or more polyether diols are appended via the monomeric diisocyanate. On account of these secondary constituents, the polymers containing silane groups that are obtained therefrom have high viscosity, as a result of which they typically have to be diluted with considerable amounts of plasticizers in order to be sufficiently free-flowing at room temperature and hence to be handled efficiently. As a result, however, freedom in the formulation of moisture-curing adhesives, sealants or coatings is limited in relation to the plasticizer content thereof. Particularly for the sealing of porous substrates and the bonding of plastics, sealants and adhesives having a very low plasticizer content are required, in order not to risk any damage to the substrates by migrating plasticizers. In addition, these known polymers containing silane groups are still in need of improvement in relation to curing rate, strength and thermal stability.

EP 1,237,967, U.S. Pat. No. 6,884,904 or EP 1,553,118 describe polymers containing isocyanate groups in which the monomeric diisocyanate is reacted with the polyether polyol in an NCO/OH ratio of well above 2/1, and the unconverted monomeric diisocyanate is then distilled off. This gives rise to advantages in relation to viscosity and EHS classification of the polymers containing isocyanate groups that are obtained.

SUMMARY OF THE INVENTION

It is an object of the present invention to provide polymers containing silane groups which, even without dilution with plasticizers or solvents, can be handled efficiently at room temperature and enable faster curing and/or higher strength coupled with good extensibility and elasticity and/or improved thermal stability.

This object is achieved by a polymer containing silane groups as claimed in claim 1. It is obtained from the reaction of a polymer containing isocyanate groups, which has previously been obtained by reacting a monomeric diisocyanate with a polyether polyol in an NCO/OH ratio of at least 3/1 and subsequent removal of a majority of the unconverted monomeric diisocyanate, with an amino-, mercapto- or hydroxysilane in a stoichiometric ratio of at least 1/1 in relation to the isocyanate groups. The inventive polymer containing silane groups is free of isocyanate groups and contains barely any silane adducts of monomeric diisocyanate, and only a low level of chain-extended polymer components. As a result, it has a particularly low viscosity at room temperature and enables moisture-curing compositions having very good processability. Surprisingly, the polymers of the invention show particularly rapid curing and, to some degree, also particularly high strength (tensile strength and/or modulus of elasticity and/or Shore hardness). The polymers of the invention can be used to produce particularly storage-stable and very efficiently processable sealants, adhesives or coatings with a low level of or entirely devoid of plasticizers or solvents, of the kind that are not obtainable proceeding from conventional polymers containing silane groups based on polymers containing isocyanate groups. The products obtained with the polymers of the invention surprisingly have advantageous properties even after curing, such as, in particular, improved thermal stability and/or particularly high strength coupled with particularly high extensibility.

Further aspects of the invention are the subject of further independent claims. Particularly preferred embodiments of the invention are the subject of the dependent claims.

WAYS OF EXECUTING THE INVENTION

The invention provides a polymer containing silane groups from the reaction of
(i) a polymer containing isocyanate groups and having an NCO content in the range from 0.3% to 4% by weight and a monomeric diisocyanate content of not more than 0.3% by weight, obtained from the reaction of at least one monomeric diisocyanate with at least one polyether polyol in a molar NCO/OH ratio of at least 3/1, and subsequent removal of a majority of the unconverted monomeric diisocyanates by means of a suitable separation method, and
(ii) with at least one amino-, mercapto- or hydroxysilane
in a stoichiometric ratio of at least 1 mol of amino-, mercapto- or hydroxysilane per molar equivalent of isocyanate groups.

"Monomeric diisocyanate" refers to an organic compound having two isocyanate groups separated by a divalent hydrocarbyl radical having 4 to 15 carbon atoms.

"NCO content" refers to the content of isocyanate groups in % by weight.

"Organosilane" or "silane" for short refers to an organic compound having at least one silane group.

An "alkoxysilane group" or "silane group" for short refers to a silyl group bonded to an organic radical and having one to three, especially two or three, hydrolyzable alkoxy radicals on the silicon atom.

"Aminosilane", "mercaptosilane" or "hydroxysilane" refer respectively to organosilanes having an amino, mercapto or hydroxyl group on the organic radical in addition to the silane group.

"Molecular weight" refers to the molar mass (in grams per mole) of a molecule or a molecule residue. "Average molecular weight" refers to the number-average molecular weight ($M_n$) of a polydisperse mixture of oligomeric or polymeric molecules or molecule residues. It is determined by gel-permeation chromatography (GPC) against polystyrene as standard.

The term "molar ratio" in connection to reactive groups relates to the ratio of the number of molar equivalents of the corresponding reactive groups.

A dotted line in the formulae in each case represents the bond between a substituent and the corresponding molecular radical.

"Plasticizer" refers to nonvolatile substances that are not chemically incorporated into the polymer in the course of curing and exert a plasticizing effect on the cured polymer.

A substance or composition is referred to as "storage-stable" or "storable" when it can be stored at room temperature in a suitable container over a prolonged period, typically over at least 3 months to up to 6 months or more, without any change in its application or use properties to a degree of relevance for the use thereof as a result of the storage.

"Room temperature" refers to a temperature of 23° C.

All industry standards and norms mentioned in this document relate to the versions valid at the date of first filing.

Percentages by weight (% by weight), abbreviated to wt %, refer to proportions by mass of a constituent of a composition or a molecule, based on the overall composition or the overall molecule, unless stated otherwise. The terms "mass" and "weight" are used synonymously in the present document.

The inventive polymer containing silane groups is free of isocyanate groups.

It is liquid and of low viscosity particularly at room temperature. In particular, it can be handled efficiently at room temperature even without dilution with plasticizers or solvents.

The polymer containing silane groups is preferably essentially free of plasticizers and solvents. In particular, it contains less than 1% by weight of plasticizer. Such a polymer, when used in a curable composition, permits complete freedom as to whether, how much and which plasticizer the composition is to contain.

The polymer containing silane groups preferably has silane groups of the formula (I)

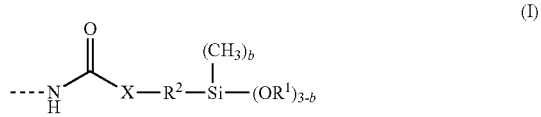

where
b is 0, 1 or 2, especially 0 or 1,
$R^1$ is an alkyl radical optionally containing ether groups and having 1 to 10 carbon atoms,
$R^2$ is a divalent hydrocarbyl radical having 1 to 12 carbon atoms that optionally has cyclic and/or aromatic moieties and optionally one or more heteroatoms, especially an amido, carbamate or morpholino group, and
X is O, S or $NR^3$ where $R^3$ is H or a monovalent hydrocarbyl radical having 1 to 20 carbon atoms that optionally has heteroatoms in the form of alkoxysilyl, ether or carboxylic ester groups.

Preferably, $R^1$ is methyl or ethyl or isopropyl.

More preferably, $R^1$ is methyl. Polymers of this kind containing silane groups are particularly reactive.

More preferably, moreover, $R^1$ is ethyl. Such polymers containing silane groups are particularly stable on storage and toxicologically advantageous.

Preferably, X is O or $NR^3$.

Preferably, $R^3$ is H, ethyl, butyl, phenyl or an aliphatic hydrocarbyl radical which has 6 to 20 carbon atoms and optionally has ether or carboxylic acid groups.

Most preferably, X is $NR^3$ and $R^3$ is

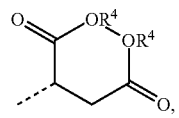

where $R^4$ is methyl or ethyl, especially ethyl.

In the case that $X=NR^3$, $R^2$ is preferably 1,3-propylene, 1,3-butylene or 1,4-butylene, where butylene may be substituted by one or two methyl groups, more preferably is 1,3-propylene.

In the case that X=O, $R^2$ is preferably a divalent hydrocarbyl radicals which has 6 to 12 carbon atoms and has an amido, carbamate or morpholino group, especially a radical of the formula

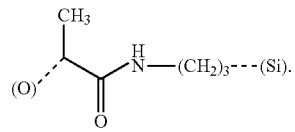

The preferred silane groups of the formula (I) enable high strengths coupled with high extensibility.

The polymer containing silane groups has an average of 1.3 to 4, more preferably 1.5 to 3.5, especially 1.7 to 3.5, silane groups per molecule.

A particularly preferred polymer containing silane groups is linear and has an average of 1.7 to 2, preferably 1.8 to 2, especially 1.9 to 2, silane groups per molecule. Such a polymer enables particularly high extensibility.

A particularly preferred polymer containing silane groups is branched and has an average of 2.1 to 3, preferably 2.2 to 3, silane groups per molecule.

The polymer containing silane groups preferably has an average molecular weight $M_n$ in the range from 3000 to 30 000 g/mol, preferably 5000 to 20 000 g/mol.

The polymer containing isocyanate groups from which the polymer containing silane groups is derived preferably has an NCO content in the range from 0.3% to 3.5% by weight, especially 0.4% to 2.5% by weight.

The polymer containing isocyanate groups preferably has an average molecular weight $M_n$ in the range from 2500 to 30 000 g/mol, preferably 4000 to 20 000 g/mol.

The polymer containing isocyanate groups preferably has a monomeric diisocyanate content of not more than 0.25% by weight, preferably not more than 0.2% by weight, especially not more than 0.15% by weight.

Suitable monomeric diisocyanates are commercial aromatic or aliphatic diisocyanates, especially diphenylmethane 4,4'-diisocyanate, optionally with fractions of diphenylmethane 2,4'- and/or 2,2'-diisocyanate (MDI), tolylene 2,4-diisocyanate or mixtures thereof with tolylene 2,6-diisocyanate (TDI), phenylene 1,4-diisocyanate (PDI), naphthalene 1,5-diisocyanate (NDI), hexane 1,6-diisocyanate (HDI), 2,2(4),4-trimethylhexamethylene 1,6-diisocyanate (TMDI), cyclohexane 1,3- or 1,4-diisocyanate, 1-isocyanato-3,3,5-trimethyl-5-isocyanatomethylcyclohexane (isophorone diisocyanate or IPDI), perhydro-diphenylmethane 2,4'- or 4,4'-diisocyanate (HMDI), 1,3- or 1,4-bis(isocyanatomethyl)cyclohexane, m- or p-xylylene diisocyanate (XDI), m-tetramethylxylylene diisocyanate (TMXDI), or mixtures thereof.

More preferably, the monomeric diisocyanate is selected from the group consisting of MDI, TDI, HDI and IPDI.

Among these, particular preference is given to IPDI. The polymers containing silane groups thus obtained are of particularly low viscosity and enable compositions having particularly good processability, high extensibility and particularly good light stability.

Among these, very particular preference is given to MDI, especially diphenylmethane 4,4'-diisocyanate (4,4'-MDI). The polymers containing silane groups thus obtained are of surprisingly low viscosity and enable compositions having good processability, particularly high strength and particularly good thermal stability. Polymers containing silane groups that are prepared proceeding from conventional polymers containing isocyanate groups that are based on MDI, by contrast, have very high viscosities and have to be diluted with a large amount of plasticizer or solvent in order to prevent gelation during preparation.

Suitable polyether polyols are commercial polyols that are preferably liquid at room temperature.

Repeat units present in the polyether polyol are preferably 1,2-ethyleneoxy, 1,2-propyleneoxy, 1,3-propyleneoxy, 1,2-butyleneoxy or 1,4-butyleneoxy groups. More preferably, it has mainly or exclusively 1,2-propyleneoxy groups. More particularly, based on all repeat units, it has 80% to 100% by weight of 1,2-propyleneoxy groups and 0% to 20% by weight of 1,2-ethyleneoxy groups.

Polyoxyalkylene diols and/or polyoxyalkylene triols are particularly suitable, especially polymerization products of ethylene oxide or 1,2-propylene oxide or 1,2- or 2,3-butylene oxide or oxetane or tetrahydrofuran or mixtures thereof, where these may be polymerized with the aid of a starter molecule having two or more active hydrogen atoms, especially a starter molecule such as water, ammonia or a compound having multiple OH or NH groups, such as, for example, ethane-1,2-diol, propane-1,2- or -1,3-diol, neopentyl glycol, diethylene glycol, triethylene glycol, the isomeric dipropylene glycols or tripropylene glycols, the isomeric butanediols, pentanediols, hexanediols, heptanediols, octanediols, nonanediols, decanediols, undecanediols, cyclohexane-1,3- or -1,4-dimethanol, bisphenol A, hydrogenated bisphenol A, 1,1,1-trimethylolethane, 1,1,1-trimethylolpropane, glycerol or aniline, or mixtures of the abovementioned compounds.

Particular preference is given to polyoxypropylene diols, polyoxypropylene triols, or ethylene oxide-terminated polyoxypropylene diols or triols. These are polyoxyethylene/polyoxypropylene copolyols which are obtained especially by further alkoxylating polyoxypropylene diols or triols with ethylene oxide on conclusion of the polypropoxylation reaction, with the result that they ultimately have primary hydroxyl groups.

Preference is given to polyether polyols having a level of unsaturation of less than 0.02 meq/g, especially less than 0.01 meq/g.

The polyether polyol preferably has an OH number in the range from 5 to 58 mg KOH/g, especially 6 to 40 mg KOH/g.

The polyether polyol preferably has an average molecular weight $M_n$ in the range from 2000 to 20 000 g/mol.

The polyether polyol preferably has an average OH functionality in the range from 1.7 to 3.

The polyether polyol is preferably a polyether diol. Such a polymer containing silane groups enables compositions having particularly high extensibility.

The polyether diol preferably has an average OH functionality in the range from 1.7 to 2, preferably 1.8 to 2, especially 1.9 to 2. As a result of their production, commercial polyether diols contain a certain content of monools, as a result of which their average OH functionality is typically slightly below 2.

The polyether diol preferably has an OH number in the range from 5 to 58 mg KOH/g, especially 6 to 33 mg KOH/g.

Particular preference is given to a polyether diol having an OH number in the range from 5 to 20 mg KOH/g, especially 6 to 15 mg KOH/g. Such a polymer enables compositions having particularly high extensibility and elasticity.

A polymer containing isocyanate groups that has been prepared with a polyether diol preferably has an NCO content in the range from 0.3% to 3.5% by weight, especially 0.4% to 2.2% by weight.

In a preferred embodiment of the invention, the polyether polyol is a polyether triol having an average OH functionality in the range from 2.2 to 3. As a result of their production, commercial polyether triols contain a certain content of monools, as a result of which their average OH functionality is typically somewhat below 3.

Such a polymer containing silane groups enables compositions having particularly good thermal stability after curing.

The polyether triol preferably has an OH number in the range from 15 to 58 mg KOH/g, especially 20 to 40 mg KOH/g.

A polymer containing isocyanate groups that has been prepared with a polyether triol preferably has an NCO content in the range from 0.8% to 3.5% by weight, especially 1.2% to 2.5% by weight.

Very particular preference is given to a polymer containing silane groups which is derived from a polyether triol and 4,4'-MDI as monomeric diisocyanate. Such a polymer is not obtainable by a conventional route without addition of large amounts of plasticizer or solvent, since it gelates in the course of preparation. When used proportionately in a moisture-curing composition based on polymers containing silane groups, it enables a significant increase in strength coupled with elevated extensibility and improved thermal stability.

The molar NCO/OH ratio in the preparation of the polymer containing isocyanate groups is preferably in the range from 3/1 to 20/1, more preferably in the range from 4/1 to 15/1, especially in the range from 5/1 to 13/1.

The reaction is preferably conducted with exclusion of moisture at a temperature in the range from 20 to 160° C., especially 40 to 140° C., optionally in the presence of suitable catalysts.

After the reaction, the monomeric diisocyanate remaining in the reaction mixture is removed by means of a suitable separation method down to the residual content described.

A preferred separation method is a distillative method, especially thin-film distillation or short-path distillation, preferably with application of reduced pressure.

Particular preference is given to a multistage method in which the monomeric diisocyanate is removed in a short-path evaporator with a jacket temperature in the range from 120 to 200° C. and a pressure of 0.001 to 0.5 mbar.

In the case of 4,4'-MDI, which is preferred as monomeric diisocyanate, distillative removal is particularly demanding. It has to be ensured, for example, that the condensate does not solidify and block the system. Preference is given to operating at a jacket temperature in the range from 160 to 200° C. at 0.001 to 0.5 mbar, and condensing the monomeric diisocyanate removed at a temperature in the range from 40 to 60° C.

Preference is given to reacting the monomeric diisocyanate with the polyether polyol and subsequently removing the majority of the monomeric diisocyanate remaining in the reaction mixture without the use of solvents or entraining agents. Preference is given to subsequently reusing the monomeric diisocyanate removed after the reaction, i.e. using it again for the preparation of polymer containing isocyanate groups.

In the reaction, the OH groups of the polyether polyol react with the isocyanate groups of the monomeric diisocyanate. This also results in what are called chain extension reactions, in that there is reaction of OH groups and/or isocyanate groups of reaction products between polyol and monomeric diisocyanate. The higher the NCO/OH ratio chosen, the lower the level of chain extension reactions that takes place, and the lower the polydispersity and hence also the viscosity of the polymer obtained. A measure of the chain extension reaction is the average molecular weight of the polymer, or the breadth and distribution of the peaks in the GPC analysis. A further measure is the effective NCO content of the polymer freed of monomers relative to the theoretical NCO content calculated from the reaction of every OH group with a monomeric diisocyanate.

The polymer containing isocyanate groups preferably contains only a low content of chain-extended components. The NCO content of the polymer is preferably at least 90%, especially at least 95%, of the theoretical NCO content which is calculated from the addition of one mole of monomeric diisocyanate per mole of OH groups of the polyether polyol.

The polymer containing isocyanate groups is liquid and of low viscosity at room temperature, contains a low content of monomeric diisocyanates and is very storage-stable with exclusion of moisture.

It is reacted with at least one amino-, mercapto- or hydroxysilane in a stoichiometric ratio of at least 1 mol of amino-, mercapto- or hydroxysilane per molar equivalent of isocyanate groups, which affords the inventive polymer containing silane groups.

The amino-, mercapto- or hydroxysilane for the reaction with the polymer containing isocyanate groups is preferably a silane of the formula (II)

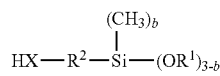

(II)

where $R^1$, $R^2$, X and b have the definitions already given.

Preferred silanes of the formula (II) are selected from the group consisting of 3-aminopropyltrimethoxysilane, 3-aminopropyldimethoxymethylsilane, 4-aminobutyltrimethoxysilane, 4-amino-3-methylbutyltrimethoxysilane, 4-amino-3,3-dimethylbutyltrimethoxysilane, N-ethyl-3-amino-(2-methylpropyl)trimethoxysilane, N-butyl-3-aminopropyltrimethoxysilane, N-phenyl-3-aminopropyltrimethoxysilane, diethyl N-(3-trimethoxysilylpropyl)aminosuccinate, diethyl N-(3-dimethoxymethylsilylpropyl)aminosuccinate, 3-mercaptopropyltrimethoxysilane, 3-mercaptopropyldimethoxymethylsilane, N-(3-trimethoxysilylpropyl)-2-hydroxypropanamide, N-(3-trimethoxysilylpropyl)-4-hydroxypentanamide, N-(3-trimethoxysilylpropyl)-4-hydroxyoctanamide, N-(3-trimethoxysilylpropyl)-5-hydroxydecanamide, N-(3-trimethoxysilylpropyl)-2-hydroxypropyl carbamate, 2-morpholino-4(5)-(2-trimethoxysilylethyl)cyclohexan-1-ol, 2-morpholino-4(5)-(2-trimethoxysilylethyl)cyclohexan-1-ol, 1-morpholino-3-(3-(triethoxysilyl)propoxy)propan-2-ol, and the corresponding analogs with ethoxy groups in place of the methoxy groups on the silicon.

A particularly preferred silane of the formula (II) is diethyl N-(3-trimethoxysilylpropyl)aminosuccinate, diethyl N-(3-triethoxysilylpropyl)aminosuccinate, diethyl N-(3-dimethoxymethylsilylpropyl)aminosuccinate, diethyl N-(3-diethoxymethylsilylpropyl)aminosuccinate, N-(3-trimethoxysilylpropyl) hydroxypropanamide, N-(3-triethoxysilylpropyl)-2-hydroxypropanamide, N-(3-dimethoxymethylsilylpropyl)-2-hydroxypropanamide or N-(3-diethoxymethylsilylpropyl)-2-hydroxypropanamide.

The amino-, mercapto- or hydroxysilane is reacted with the polymer containing isocyanate groups in a stoichiometric ratio of at least 1 mol of amino-, mercapto- or hydroxysilane per molar equivalent of isocyanate groups.

Preference is given to a stoichiometry in the range from 1 to 1.3, preferably 1 to 1.2, especially 1 to 1.1, mol of amino-, mercapto- or hydroxysilane per molar equivalent of isocyanate groups.

The reaction is conducted at a temperature in the range from 20 to 160° C., especially 60 to 120° C. A catalyst is optionally used here, especially a tertiary amine or a metal compound, especially a bismuth(III), zinc(II), zirconium (IV) or tin(II) compound or an organotin(IV) compound.

A particularly preferred polymer containing silane groups is derived from a polyether triol, as already described. Such a polymer containing silane groups has an average of more than 2, preferably 2.1 to 4, especially 2.2 to 3.5, silane groups per molecule. It enables compositions having particularly good thermal stability after curing.

It is preferably used in combination with a further, preferably linear, polymer containing silane groups, with the inventive polymer containing silane groups especially enabling improved thermal stability.

A particularly preferred polymer containing silane groups is derived from IPDI as monomeric diisocyanate. It thus especially has silane groups of the formula (Ia) or (Ib)

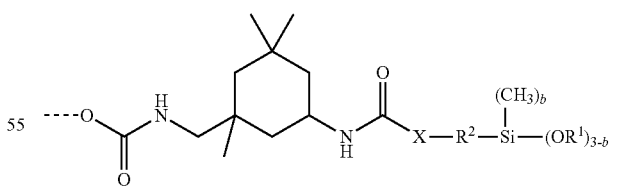

(Ia)

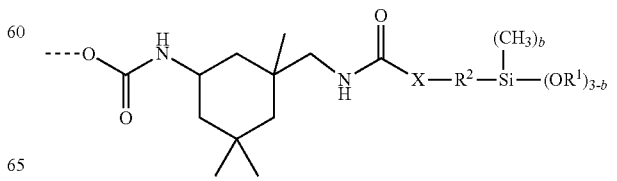

(Ib)

where $R^1$, $R^2$, X and b have the definitions already given.

Such a polymer enables high extensibility and particularly high light stability coupled with particularly good thermal stability.

Very particular preference is given to a polymer containing silane groups which is derived from a polyether triol and 4,4'-MDI as monomeric diisocyanate.

It thus especially has silane groups of the formula (Ic)

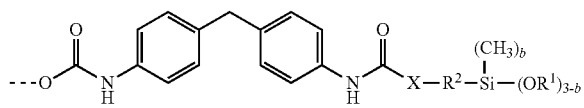

where $R^1$, $R^2$, X and b have the definitions already given.

Such a polymer is not obtainable by a conventional route without addition of large amounts of plasticizer or solvent, since it gelates in the course of preparation. It enables compositions having particularly high strength and particularly good thermal stability. It is more preferably used in combination with a further, preferably linear, polymer containing silane groups, enabling improved strength coupled with very high extensibility and improved thermal stability.

The polymer containing silane groups is storage-stable with exclusion of moisture. On contact with moisture, the silane groups are hydrolyzed. This forms silanol groups (Si—OH groups) and, through subsequent condensation reactions, siloxane groups (Si—O—Si groups). As a result of these reactions, the polymer cures to give a crosslinked plastic. The moisture for the curing may either come from the air (air humidity) or the polymer may be contacted with a water-containing component, for example by painting, spraying or mixing. During the curing, silanol groups can condense with, for example, hydroxyl groups of a substrate to which the polymer has been applied, as a result of which an additional improvement in adhesion to the substrate is possible on crosslinking.

The invention further provides a process for preparing the polymer containing silane groups, characterized in that
(a) at least one monomeric diisocyanate is reacted with at least one polyether polyol having an OH number in the range from 5 to 58 mg KOH/g, especially 6 to 40 mg KOH/g, in a molar NCO/OH ratio of at least 3/1,
(b) then a majority of the unconverted monomeric diisocyanate is removed by means of a suitable separation method,
(c) and the polymer containing isocyanate groups obtained is finally reacted with at least one amino-, mercapto- or hydroxysilane in a stoichiometric ratio of at least 1 mol of amino-, mercapto- or hydroxysilane per molar equivalent of isocyanate groups.

The invention further provides a curable composition comprising the inventive polymer containing silane groups and at least one further constituent selected from the group consisting of catalysts, crosslinkers, adhesion promoters, desiccants, plasticizers and fillers.

Suitable catalysts are metal catalysts and/or nitrogen compounds that accelerate the crosslinking of polymers containing silane groups.

Suitable metal catalysts are especially compounds of titanium, zirconium, aluminum, or tin, especially organotin compounds, organotitanates, organozirconates or organoaluminates, these compounds especially having alkoxy groups, aminoalkoxy groups, sulfonate groups, carboxyl groups, 1,3-diketonate groups, 1,3-ketoesterate groups, dialkyl phosphate groups or dialkyl pyrophosphate groups.

Particularly suitable organotin compounds are dialkyltin oxides, dialkyltin dichlorides, dialkyltin dicarboxylates and dialkyltin diketonates, especially dibutyltin oxide, dibutyltin dichloride, dibutyltin diacetate, dibutyltin dilaurate, dibutyltin diacetylacetonate, dioctyltin oxide, dioctyltin dichloride, dioctyltin diacetate, dioctyltin dilaurate or dioctyltin diacetylacetonate, or alkyltin thioesters.

Particularly suitable organotitanates are bis(ethylacetoacetato)diisobutoxytitanium(IV), bis(ethylacetoacetato)diisopropoxytitanium(IV), bis(acetylacetonato)diisopropoxytitanium(IV), bis(acetylacetonato)diisobutoxytitanium(IV), tris(oxyethyl)amineisopropoxytitanium(IV), bis[tris(oxyethyl)amine]diisopropoxytitanium(IV), bis(2-ethylhexane-1,3-dioxy)titanium(IV), tris[2((2-aminoethyl)amino)ethoxy]ethoxytitanium(IV), bis(neopentyl(diallyl)oxy)-diethoxytitanium(IV), titanium(IV) tetrabutoxide, tetra(2-ethylhexyloxy) titanate, tetra(isopropoxy) titanate or polybutyl titanate. Especially suitable are the commercially available products Tyzor® AA, GBA, GBO, AA-75, AA-65, AA-105, DC, BEAT, BTP, TE, TnBT, KTM, TOT, TPT or IBAY (all from Dorf Ketal); Tytan PBT, TET, X85, TAA, ET, S2, S4 or S6 (all from Borica Company Ltd.) and Ken-React® KR® TTS, 7, 9QS, 12, 26S, 33DS, 38S, 39DS, 44, 134S, 138S, 133DS, 158FS or LICA® 44 (all from Kenrich Petrochemicals). Particularly suitable organozirconates are the commercially available products Ken-React® NZ® 38J, KZ® TPPJ, KZ® TPP, NZ® 01, 09, 12 38, 44 or 97 (all from Kenrich Petrochemicals) or Snapcure® 3020, 3030, 1020 (all from Johnson Matthey & Brandenberger).

A particularly suitable organoaluminate is the commercially available product K-Kat 5218 (from King Industries).

Nitrogen compounds suitable as catalyst are especially amines such as, in particular, N-ethyldiisopropylamine, N,N,N',N'-tetramethylalkylenediamines, polyoxyalkyleneamines, 1,4-diazabicyclo[2.2.2]octane; aminosilanes such as, in particular, 3-aminopropyltrimethoxysilane, 3-aminopropyldimethoxylmethylsilane, N-(2-aminoethyl)-3-aminopropyltrimethoxysilane, N-(2-aminoethyl) aminopropylmethyldimethoxysilane, N-(2-aminoethyl)-N'-[3-(trimethoxysilyl)propyl]ethylenediamine or analogs thereof with ethoxy groups instead of methoxy groups on the silicon; cyclic amidines such as, in particular, 1,8-diazabicyclo[5.4.0]undec-7-ene (DBU), 1,5-diazabicyclo[4.3.0]non-5-ene (DBN), 6-dibutylamino-1,8-diazabicyclo[5.4.0]undec-7-ene; guanidines such as, in particular, tetramethylguanidine, 2-guanidinobenzimidazole, acetylacetoneguanidine, 1,3-di-o-tolylguanidine, 2-tert-butyl-1,1,3,3-tetramethylguanidine, or reaction products of carbodiimides and amines, such as, in particular, polyetheramines or aminosilanes; or imidazoles such as, in particular, N-(3-trimethoxysilylpropyl)-4,5-dihydroimidazole or N-(3-triethoxysilylpropyl)-4,5-dihydroimidazole.

Also suitable are combinations of different catalysts, especially combinations of at least one metal catalyst and at least one nitrogen compound.

Preferred catalysts are organotin compounds, organotitanates, amines, especially aminosilanes, amidines, guanidines or imidazoles.

Suitable adhesion promoters and/or crosslinkers are especially aminosilanes, mercaptosilanes, epoxysilanes, (meth)acrylosilanes, anhydridosilanes, carbamatosilanes, alkylsilanes or iminosilanes, or oligomeric forms of these silanes, or adducts of primary aminosilanes with epoxysilanes or (meth)acrylosilanes or anhydridosilanes. Particularly suitable are 3-glycidoxypropyltrimethoxysilane, 3-aminopropyltrimethoxysilane, N-(2-aminoethyl)-3-aminopropyltrimethoxysilane, N-(2-aminoethyl)-N'-[3-(trimethoxysilyl)propyl]ethylenediamine, 3-mercaptopropyltrimethoxysilane, 3-ureidopropyltrimethoxysilane or the corresponding silanes with ethoxysilane groups in place of the methoxysilane groups on the silicon, or oligomeric forms of these silanes.

Particularly suitable desiccants are tetraethoxysilane, vinyltrimethoxysilane, vinyltriethoxysilane, organosilanes having a functional group in a position to the silane group, especially N-(methyldimethoxysilylmethyl)-O-methylcarbamate or (methacryloyloxymethyl)silanes, methoxymethylsilanes, orthoformic esters, and also calcium oxide or molecular sieves. Preference is given to vinyltrimethoxysilane or vinyltriethoxysilane. Preference is given here to vinyltrimethoxysilane if the polymer containing silane groups has methoxysilane groups, while vinyltriethoxysilane is preferred if the polymer containing silane groups has ethoxysilane groups.

Suitable plasticizers are especially carboxylic esters, such as phthalates, especially diisononyl phthalate (DINP), diisodecyl phthalate (DIDP) or di(2-propylheptyl)phthalate (DPHP), hydrogenated phthalates or cyclohexane-1,2-dicarboxylates, especially hydrogenated diisononyl phthalate or diisononyl cyclohexane-1,2-dicarboxylate (DINCH), terephthalates, especially bis(2-ethylhexyl) terephthalate (DOTP) or diisononyl terephthalate (DINT), hydrogenated terephthalates or cyclohexane-1,4-dicarboxylates, especially hydrogenated bis(2-ethylhexyl) terephthalate or bis(2-ethylhexyl) cyclohexane-1,4-dicarboxylate, or hydrogenated diisononyl terephthalate or diisononyl cyclohexane-1,4-dicarboxylate, isophthalates, trimellitates, adipates, especially dioctyl adipate, azelates, sebacates, benzoates, polyols, especially polyether polyols or polyester polyols, glycol ethers, glycol esters, polyether mono- or polyols having blocked hydroxyl groups, especially in the form of acetate groups, organic phosphoric or sulfonic esters, polybutenes or plasticizers derived from natural fats or oils, especially fatty acid methyl or ethyl esters, also called "biodiesel", or epoxidized soybean or linseed oil.

Suitable fillers are especially ground or precipitated calcium carbonates, optionally coated with fatty acids, especially stearates, barites, quartz flours, quartz sands, dolomites, wollastonites, calcined kaolins, sheet silicates, such as mica or talc, zeolites, aluminum hydroxides, magnesium hydroxides, silicas, including finely divided silicas from pyrolysis processes, cements, gypsums, fly ashes, industrially produced carbon blacks, graphite, metal powders, for example of aluminum, copper, iron, silver or steel, PVC powders or hollow beads. Preference is given to precipitated, fatty acid-coated calcium carbonate and/or carbon black.

Further suitable constituents are especially the following auxiliaries and additives:
  further oligomers or polymers containing silane groups;
  solvents;
  fibers, in particular glass fibers, carbon fibers, metal fibers, ceramic fibers, polymer fibers, such as polyamide fibers or polyethylene fibers, or natural fibers, such as wool, cellulose, hemp or sisal;
  nanofillers such as graphene or carbon nanotubes;
  dyes;
  inorganic or organic pigments, in particular titanium dioxide, chromium oxides or iron oxides;
  rheology modifiers, in particular thickeners, in particular sheet silicates, such as bentonites, derivatives of castor oil, hydrogenated castor oil, polyamides, polyamide waxes, polyurethanes, urea compounds, fumed silicas, cellulose ethers or hydrophobically modified polyoxyethylenes;
  stabilizers against oxidation, heat, light or UV radiation;
  natural resins, fats or oils, such as rosin, shellac, linseed oil, castor oil or soybean oil;
  nonreactive polymers, in particular homo- or copolymers of unsaturated monomers, in particular from the group comprising ethylene, propylene, butylene, isobutylene, isoprene, vinyl acetate or alkyl (meth)acrylates, in particular polyethylenes (PE), polypropylenes (PP), polyisobutylenes, ethylene/vinyl acetate copolymers (EVA) or atactic poly-a-olefins (APAO);
  flame-retardant substances, especially the already mentioned fillers aluminum hydroxide or magnesium hydroxide, or organic phosphoric esters;
  additives, in particular wetting agents, leveling agents, defoamers, deaerators, stabilizers against oxidation, heat, light or UV radiation, or biocides.

It may be advisable to subject certain constituents to chemical or physical drying before mixing them into the composition.

The curable composition contains preferably 5% to 80% by weight, more preferably 10% to 70% by weight, especially 20% to 60% by weight, of polymers containing silane groups.

In a preferred embodiment of the invention, the curable composition comprises at least one inventive polymer containing silane groups, derived from a polyether triol and at least one further, especially linear, polymer containing silane groups.

The weight ratio here between the inventive polymer containing silane groups derived from a polyether triol and the further polymer containing silane groups is preferably in the range from 10/90 to 70/30, especially 15/85 to 60/40.

The further polymer containing silane groups is preferably selected from the group consisting of
  inventive polymers containing silane groups that are derived from a polyether diol;
  polymers containing silane groups that are derived from polymers containing isocyanate groups from the reaction of monomeric isocyanates and polyether polyols, especially diols, in a molar NCO/OH ratio in the range from 1.3 to 2.5/1, especially 1.8 to 2.5/1, without subsequent removal of monomeric diisocyanates;
  polyethers containing silane groups that are obtained from the reaction of polyethers containing allyl groups with hydrosilanes, optionally with chain extension, especially with diisocyanates;
  polyethers containing silane groups that are obtained from the copolymerization of alkylene oxides and epoxysilanes, optionally with chain extension, especially with diisocyanates;
  polyethers containing silane groups that are obtained from the reaction of polyether polyols, especially diols, with isocyanatosilanes, optionally with chain extension using diisocyanates.

The inventive polymer containing silane groups which is derived from a polyether triol especially improves the thermal stability and possibly the strength and/or extensibility of the composition.

The curable composition is especially produced with exclusion of moisture and stored at ambient temperature in moisture-tight containers. A suitable moisture-tight container especially consists of an optionally coated metal and/or plastic, and is especially a drum, a transport box, a hobbock, a bucket, a canister, a can, a bag, a tubular bag, a cartridge or a tube.

The curable composition may be in the form of a one-component composition or in the form of a two-component composition.

A "one-component" composition refers to one in which all constituents of the composition are stored mixed together in the same container and which is curable with moisture.

A "two-component" composition refers to one in which the constituents of the composition are present in two different components that are stored in separate containers. The two components are not mixed with one another until shortly before or during application of the composition, whereupon the mixed composition cures, with the curing proceeding or being completed only by the action of moisture.

The curable composition is preferably a one-component composition. Given suitable packaging and storage, it is storage-stable, typically for several months up to one year or longer.

On application of the curable composition, the silane groups present come into contact with moisture, which commences the process of curing. The curing proceeds at different speeds according to temperature, type of contact, the amount of moisture and the presence of any catalysts. In the case of curing by means of air humidity, a skin is at first formed on the surface of the composition. What is called the skin time is a measure of the curing rate.

This results in the cured composition.

In the case of a one-component composition, it is applied as is and then begins to cure under the influence of moisture or water. For acceleration of the curing, an accelerator component which contains or releases water and/or a catalyst and/or a curing agent can be mixed into the composition on application, or the composition, after application thereof, can be contacted with such an accelerator component. The curable composition is preferably applied at ambient temperature, especially in the range from about −10 to 50° C., preferably in the range from −5 to 45° C., especially 0 to 40° C.

The curing is preferably likewise effected at ambient temperature.

In the cured state, the composition has markedly elastic properties, in particular high strength and high extensibility, good thermal stability and good adhesion properties on various substrates. As a result, it is suitable for a multitude of uses, especially as sealant, adhesive, covering, coating or paint for construction or industrial applications, for example as joint sealant, parquet adhesive, assembly adhesive, glazing adhesive, as bodywork sealant, seam sealant or cavity sealant, as floor covering, floor coating, balcony coating, roof coating or parking garage coating.

Preference is given to using the curable composition as elastic adhesive or elastic sealant or elastic coating.

The curable composition can be formulated such that it has a pasty consistency with structurally viscous properties. A composition of this kind is applied by means of a suitable device, for example from commercial cartridges or kegs or hobbocks, for example in the form of a bead, which may have an essentially round or triangular cross-sectional area.

The curable composition can also be formulated such that it is fluid and "self-leveling" or only slightly thixotropic and can be poured out for application. As coating, it can, for example, subsequently be distributed flat up to the desired layer thickness, for example by means of a roller, a slide bar, a toothed applicator or a trowel. In one operation, typically a layer thickness in the range from 0.5 to 3 mm, especially 1 to 2.5 mm, is applied.

Suitable substrates for bonding or sealing or coating are especially glass, glass ceramic, screenprinted ceramic, concrete, mortar, cement screed, fiber cement, especially fiber cement boards, brick, tile, gypsum, especially gypsum boards or anhydride screed, or natural stone, such as granite or marble;

metals or alloys, such as aluminum, copper, iron, steel, nonferrous metals, including surface-finished metals or alloys, such as zinc-plated or chromium-plated metals;

plastics, in particular rigid or flexible PVC, polycarbonate (PC), polyamide (PA), polyesters, PMMA, ABS, SAN, epoxy resins, phenolic resins, PUR, POM, TPO, PE, PP, EPM or EPDM, where the surface of the plastics has optionally undergone plasma, corona or flame treatment;

paints or varnishes, especially automotive topcoats;

repair or leveling compounds based on PCC (polymer-modified cement mortar) or ECC (epoxy resin-modified cement mortar);

asphalt or bitumen;

leather, textiles, paper, wood, wood materials bonded with resins, such as phenolic, melamine or epoxy resins, resin/textile composites or further materials called polymer composites;

insulation foams, especially made of EPS, XPS, PUR, PIR, rock wool, glass wool or foamed glass.

If required, the substrates can be pretreated prior to application, especially by physical and/or chemical cleaning methods or the application of an activator or a primer.

It is possible to bond or seal two identical or two different substrates.

After the bonding or sealing of two substrates, a bonded or sealed article is obtained. This article may be a built structure or a part thereof, especially a built structure in civil engineering above or below ground, a bridge, a roof, a staircase or a façade, or it may be an industrial good or a consumer good, especially a window, a pipe, a domestic appliance or a mode of transport, such as especially an automobile, a bus, a truck, a rail vehicle, a ship, an aircraft or a helicopter, or an installable component thereof.

In one embodiment, the curable composition additionally comprises at least one epoxy resin. Such a composition preferably has two components. It especially comprises at least one further constituent selected from aminosilanes, epoxysilanes, vinylsilanes, polyamines having two or three primary or secondary aliphatic amino groups and accelerators for the reaction of epoxy groups. It optionally additionally comprises water.

Compounds having amino groups and the epoxy resin are preferably not in the same component.

The weight ratio between polymers containing silane groups and the epoxy resin is preferably in the range from 20/80 to 70/30.

Such a composition has particularly high strength, with a high content of epoxy resin enabling very particularly high strength and a high content of polymer containing silane groups enabling high extensibility and elasticity coupled with high strength.

A suitable epoxy resin is especially a liquid epoxy resin which is free-flowing at room temperature and has a glass-transition temperature below 25° C. Preference is given to a liquid epoxy resin based on a bisphenol A diglycidyl ether, bisphenol F diglycidyl ether or bisphenol A/F diglycidyl ether, especially one of technical grade quality, as commercially available, for example, from Dow, Huntsman or Momentive, optionally including proportions of solid bisphenol A resin or phenol novolaks.

Particularly suitable silanes for such a composition are 3-aminopropyltrimethoxysilane, 3-aminopropyltriethoxysilane, N-(2-aminoethyl)-3-aminopropyltrimethoxysilane, N-(2-aminoethyl)-3-aminopropyltriethoxysilane, vinyltrimethoxysilane, vinyltriethoxysilane, 3-glycidoxypropyltrimethoxysilane, 3-glycidoxypropyltriethoxysilane, vinyltrimethoxysilane or vinyltriethoxysilane.

Suitable polyamines are especially 2,2-dimethylpropane-1,3-diamine, pentane-1,3-diamine (DAMP), pentane-1,5-diamine, 1,5-diamino-2-methylpentane (MPMD), 2-butyl-2-ethylpentane-1,5-diamine (C11 neodiamine), hexane-1,6-diamine, 2,5-dimethylhexane-1,6-diamine, 2,2(4),4-trimethylhexamethylenediamine (TMD), heptane-1,7-diamine, octane-1,8-diamine, nonane-1,9-diamine, decane-1,10-diamine, undecane-1,11-diamine, dodecane-1,12-diamine, 1,2-, 1,3- or 1,4-diaminocyclohexane, 1,3-bis(aminomethyl)cyclohexane, 1,4-bis(aminomethyl)cyclohexane, 1-amino-3-aminomethyl-3,5,5-trimethylcyclohexane (isophoronediamine or IPDA), 2(4)-methyl-1,3-diaminocyclohexane, bis(4-aminocyclohexyl)methane, bis(4-amino-3-methylcyclohexyl)methane, bis(4-amino-3-ethylcyclohexyl)methane, bis(4-amino-3,5-dimethylcyclohexyl)methane, bis(4-amino-3-ethyl-5-methylcyclohexyl)methane, 2,5(2,6)-bis(aminomethyl)bicyclo[2.2.1]heptane (NBDA), 3(4),8(9)-bis(aminomethyl)tricyclo[5.2.1.0$^{2,6}$]decane, 1,4-diamino-2,2,6-trimethylcyclohexane (TMCDA), menthane-1,8-diamine, 1,3-bis(aminomethyl)benzene (MXDA) or 1,4-bis(aminomethyl)benzene, 3-(2-aminoethyl)aminopropylamine, bis(hexamethylene)triamine (BHMT), diethylenetriamine (DETA), triethylenetetramine (TETA), tetraethylenepentamine (TEPA), pentaethylenehexamine (PEHA) or higher homologs of linear polyethyleneamines, dipropylenetriamine (DPTA), N-(2-aminoethyl)propane-1,3-diamine (N3 amine), N,N'-bis(3-aminopropyl)ethylenediamine (N4 amine), N,N'-bis(3-aminopropyl)-1,4-diaminobutane, N5-(3-aminopropyl)-2-methylpentane-1,5-diamine, N3-(3-aminopentyl)pentane-1,3-diamine, N5-(3-amino-1-ethylpropyl)-2-methylpentane-1,5-diamine or N,N'-bis(3-amino-1-ethylpropyl)-2-methylpentane-1,5-diamine, 2-aminoethylpiperazine, 3-dimethylaminopropylamine (DMAPA), N,N-dimethyldi(1,3-propylene)triamine (DMAPAPA), N,N'-bis(aminoethyl)piperazine, N,N'-bis(aminopropyl)piperazine, N,N-bis(3-aminopropyl)methylamine, N,N-bis(3-aminopropyl)ethylamine, 4-aminomethyloctane-1,8-diamine, 1,3,5-tris(aminomethyl)benzene, 1,3,5-tris(aminomethyl)cyclohexane, tris(2-aminoethyl)amine, tris(2-aminopropyl)amine, tris(3-aminopropyl)amine, N-benzylethane-1,2-diamine, N-benzylpropane-1,2-diamine, N-benzyl-1,3-bis(aminomethyl)benzene, N-2-ethylhexyl-1,3-bis(aminomethyl)benzene, N-(2-phenylethyl)-1,3-bis(aminomethyl)benzene, 3,6-dioxaoctane-1,8-diamine, 4,7-dioxadecane-1,10-diamine, 4,7-dioxadecane-2,9-diamine, 4,9-dioxadodecane-1,12-diamine, 5,8-dioxadodecane-3,10-diamine, 4,7,10-trioxatridecane-1,13-diamine or higher oligomers of these diamines, bis(3-aminopropyl)polytetrahydrofurans or other polytetrahydrofurandiamines, 3,9-bis(3-aminopropyl)-2,4,8,10-tetraoxaspiro[5.5]undecane, polyoxyalkylenedi- or -triamines, especially Jeffamine® D-230, Jeffamine® D-400, Jeffamine® D-2000, Jeffamine® EDR-104, Jeffamine® EDR-148, Jeffamine® EDR-176, Jeffamine® T-403, Jeffamine® T-3000, Jeffamine® T-5000 (all from Huntsman), or adducts of these or further polyamines with epoxy resins or monoepoxides, such as, in particular, cresyl glycidyl ether, and also what are called polyamidoamines or what are called Mannich bases, especially phenalkamines.

Preference is given to MPMD, TMD, 1,2-diaminocyclohexane, 1,3-diaminocyclohexane, 1,4-diaminocyclohexane, 1,3-bis(aminomethyl)cyclohexane, 1,4-bis(aminomethyl)cyclohexane, IPDA, 2(4)-methyl-1,3-diaminocyclohexane, bis(4-aminocyclohexyl)methane, NBDA, MXDA, BHMT, TETA, TEPA, N4 amine, DMAPAPA, N-benzylethane-1,2-diamine, polyoxypropylenediamines or -triamines having average molecular weight $M_n$ in the range from 200 to 500 g/mol, or adducts of MPMD or propane-1,2-diamine with cresyl glycidyl ether.

Suitable accelerators for the reaction of epoxy groups are especially acids or compounds that are hydrolyzable to acids, especially organic carboxylic acids such as salicylic acid, organic sulfonic acids such as p-toluenesulfonic acid, sulfonic esters, phosphoric acid, or nitrates such as, in particular, calcium nitrate, or tertiary amines such as, in particular, 1,4-diazabicyclo[2.2.2]octane, triethanolamine, imidazoles such as, in particular, N-methylimidazole, N-vinylimidazole or 1,2-dimethylimidazole, amidines or guanidines, phenols, Mannich bases such as, in particular, 2,4,6-tris(dimethylaminomethyl)phenol, or compounds having mercapto groups.

More preferably, an epoxy resin-comprising curable composition comprises at least one aminosilane and optionally a vinylsilane, optionally 2,4,6-tris(dimethylaminomethyl)phenol, optionally a polyamine and optionally a tin catalyst.

Such an epoxy resin-comprising curable composition cures by mixing of the two components of the composition with one another and contact of the composition with moisture. Silane groups present react here with moisture, as described above, and epoxy groups present react with primary or secondary amino groups and/or with one another, and the aminosilane is able to connect the polyether polymer phase and the epoxy resin phase to one another via the silane group and via the amino group. This results in a high-quality material of high strength, impact resistance, stability and, depending on the ratio between polymer containing silane groups and epoxy resin, greater or lesser extensibility and elasticity.

The invention further provides the cured composition obtained from the curable composition after contact thereof with moisture.

EXAMPLES

Working examples are adduced hereinafter, which are intended to further elucidate the invention described. The invention is of course not limited to these described working examples.

"Standard climatic conditions" ("SCC") refer to a temperature of 23±1° C. and a relative air humidity of 50±5%.

Unless stated otherwise, the chemicals used were from Sigma-Aldrich. Diisodecyl phthalate was used in the form of Palatinol® 10-P (from BASF).

Viscosity was measured with a thermostated Rheotec RC30 cone-plate viscometer (cone diameter 25 mm, cone angle 1°, cone tip-plate distance 0.05 mm, shear rate 10 s$^{-1}$).

Monomeric diisocyanate content was determined by means of HPLC (detection via photodiode array; 0.04 M sodium acetate/acetonitrile as mobile phase) after prior derivatization by means of N-propyl-4-nitrobenzylamine.

Preparation of Polymers Containing Isocyanate Groups with Removal of Monomer

Polymer D-1

812.0 g (0.15 eq OH) of polyoxypropylene diol (OH number 10 mg KOH/g, Acclaim® 12200N, from Covestro) and 166.6 g (1.5 eq NCO) of IPDI (1-isocyanato-3,3,5-trimethyl-5-isocyanatomethylcyclohexane, Vestanat® IPDI, from Evonik) were reacted by a known method at 80° C. to give a polymer having an NCO content of 5.7% by weight, a viscosity of 11.0 Pas at 20° C. and a monomeric IPDI content of about 9.5% by weight.

Subsequently, the volatile constituents, especially a majority of the monomeric IPDI, were removed by distillation in a short-path evaporator (jacket temperature 160° C., pressure 0.1 to 0.005 mbar). The linear polymer thus obtained had an NCO content of 0.85% by weight, a viscosity of 19.1 Pas at 20° C. and a monomeric IPDI content of 0.06% by weight.

Polymer D-2

725.0 g of ethylene oxide-terminated polyoxypropylene triol (OH number 28 mg KOH/g, Desmophen® 5031 BT, from Covestro) and 275 g of diphenylmethane 4,4'-diisocyanate (Desmodur 44 MC L, from Covestro) were converted by a known method at 80° C. to a polymer having an NCO content of 7.6% by weight, a viscosity of 6.5 Pas at 20° C. and a monomeric diphenylmethane 4,4'-diisocyanate content of about 20% by weight.

Subsequently, the volatile constituents, especially a majority of the monomeric diphenylmethane 4,4'-diisocyanate, were removed by distillation in a short-path evaporator (jacket temperature 180° C., pressure 0.1 to 0.005 mbar, condensation temperature 47° C.). The polymer thus obtained had an NCO content of 1.7% by weight, a viscosity of 19 Pas at 20° C. and a monomeric diphenylmethane 4,4'-diisocyanate content of 0.04% by weight.

Polymer D-3

780.0 g of ethylene oxide-terminated polyoxypropylene triol (OH number 28 mg KOH/g, Desmophen® 5031 BT, from Covestro) and 220 g of IPDI (1-isocyanato-3,3,5-trimethyl-5-isocyanatomethylcyclohexane, Vestanat® IPDI, from Evonik) were converted in the presence of 0.01 g of dibutyltin dilaurate by a known method at 80° C. to a polymer having an NCO content of 6.4% by weight, a viscosity of 4.1 Pas at 20° C. and a monomeric IPDI content of about 12% by weight. Subsequently, the volatile constituents, especially the majority of the monomeric IPDI, were removed by distillation in a short-path evaporator (jacket temperature 160° C., pressure 0.1 to 0.005 mbar). The polymer thus obtained had an NCO content of 1.9% by weight, a viscosity of 8.2 Pas at 20° C. and a monomeric IPDI content of 0.02% by weight.

Polymer D-4

727.0 g of polyoxypropylene diol (OH number 28 mg KOH/g, Acclaim® 4200, from Covestro) and 273.0 g of diphenylmethane 4,4'-diisocyanate (Desmodur 44 MC L, from Covestro) were converted by a known method at 80° C. to a polymer having an NCO content of 7.4% by weight, a viscosity of 5.2 Pas at 20° C. and a monomeric diphenylmethane 4,4'-diisocyanate content of about 17% by weight.

Subsequently, the volatile constituents, especially a majority of the monomeric diphenylmethane 4,4'-diisocyanate, were removed by distillation in a short-path evaporator (jacket temperature 180° C., pressure 0.1 to 0.005 mbar, condensation temperature 47° C.). The linear polymer thus obtained had an NCO content of 1.8% by weight, a viscosity of 13.3 Pas at 20° C. and a monomeric diphenylmethane 4,4'-diisocyanate content of 0.08% by weight.

Preparation of Conventional Polymers Containing Isocyanate Groups

Polymer C-1: (NCO/OH=2.1/1)

1000.0 g of polyoxypropylene diol (OH number 10 mg KOH/g, Acclaim® 12200N, from Covestro), 122.8 g of diisodecyl phthalate, 41.6 g of IPDI (1-isocyanato-3,3,5-trimethyl-5-isocyanatomethylcyclohexane, Vestanat® IPDI, from Evonik) and 0.12 g of dibutyltin dilaurate were converted by a known method at 90° C. to a polymer having an NCO content of 0.63% by weight, a viscosity of 31 Pas at 20° C. and a monomeric IPDI content of about 0.5% by weight.

Polymer C-2: (NCO/OH=2.1/1)

190.0 g of ethylene oxide-terminated polyoxypropylene triol (OH number 28 mg KOH/g, Desmophen® 5031 BT, from Covestro) and 25.0 g of diphenylmethane 4,4'-diisocyanate (Desmodur® 44 MC L, from Covestro) were converted by a known method at 80° C. The reaction mixture gelated during the reaction and was thus unsuitable for further use.

Silanes of the formula (II) used:

| | |
|---|---|
| Silane A-1 | Diethyl N-(3-trimethoxysilylpropyl)aminosuccinate (351.5 g/mol), obtained from the reaction of 3-aminopropyltrimethoxysilane and diethyl maleate in a molar ratio of about 1/1 |
| Silane A-2 | Diethyl N-(3-triethoxysilylpropyl)aminosuccinate (393.6 g/mol), obtained from the reaction of 3-aminopropyltriethoxysilane and diethyl maleate in a molar ratio of about 1/1 |
| Silane A-3 | N-(3-Diethoxymethylsilylpropyl)-2-hydroxypropanamide (263.4 g/mol), obtained from the reaction of 3-aminopropyldiethoxymethylsilane and L-lactide in a molar ratio of about 2/1 |

Preparation of Polymers Containing Silane Groups

Polymer S-1: (Inventive)

To an initial charge of 300 g of polymer D-1, prepared as described above, under a nitrogen atmosphere with exclusion of moisture were added 25.1 g of silane A-2, and the mixture was stirred at 60° C. until no isocyanate groups were detectable any longer by means of FT-IR spectroscopy. The resultant polymer was cooled down to room temperature and stored with exclusion of moisture. It was clear and had a viscosity the day after production of 40 Pas at 20° C.

Polymer S-2: (Inventive)

To an initial charge of 300 g of polymer D-1, prepared as described above, under a nitrogen atmosphere with exclusion of moisture were added 16.8 g of silane A-3 and 0.06 g of Bi catalyst (Coscat® 83, from Vertellus), and the mixture was stirred at 80° C. until no isocyanate groups were detectable any longer by means of FT-IR spectroscopy. The resultant polymer was cooled down to room temperature and stored with exclusion of moisture. It was clear and had a viscosity the day after production of 90 Pas at 20° C.

Polymer S-3: (Inventive)

To an initial charge of 247.0 g of polymer D-2, prepared as described above, under a nitrogen atmosphere with exclusion of moisture was added 36.2 g of silane A-1, and the mixture was stirred at 60° C. until no isocyanate groups were detectable any longer by means of FT-IR spectroscopy. The resultant polymer was cooled down to room temperature and stored with exclusion of moisture. It was clear and had a viscosity the day after production of 357 Pas at 20° C.

Polymer S-4: (Inventive)

To an initial charge of 221.0 g of polymer D-3, prepared as described above, under a nitrogen atmosphere with exclusion of moisture was added 36.2 g of silane A-1, and the mixture was stirred at 60° C. until no isocyanate groups were detectable any longer by means of FT-IR spectroscopy. The resultant polymer was cooled down to room temperature and stored with exclusion of moisture. It was clear and had a viscosity the day after production of 70 Pas at 20° C.

Polymer S-5: (Inventive)

To an initial charge of 233.3 g of polymer D-4, prepared as described above, under a nitrogen atmosphere with exclusion of moisture was added 36.2 g of silane A-1, and the mixture was stirred at 60° C. until no isocyanate groups were detectable any longer by means of FT-IR spectroscopy. The resultant polymer was cooled down to room temperature and stored with exclusion of moisture. It was clear and had a viscosity the day after production of 108 Pas at 20° C.

Polymer R-0: (Comparative)

To an initial charge of 333.3 g of polymer C-1, prepared as described above, under a nitrogen atmosphere with exclusion of moisture were added 18.1 g of silane A-1, and the mixture was stirred at 60° C. until no isocyanate groups were detectable any longer by means of FT-IR spectroscopy. The resultant polymer was cooled down to room temperature and stored with exclusion of moisture. It contained 10% by weight of plasticizer (diisodecyl phthalate), was clear and had a viscosity the day after production of 99 Pas at 20° C.

Polymer R-1: (Comparative)

To an initial charge of 333.3 g of polymer C-1, prepared as described above, under a nitrogen atmosphere with exclusion of moisture were added 20.2 g of silane A-2, and the mixture was stirred at 60° C. until no isocyanate groups were detectable any longer by means of FT-IR spectroscopy. The resultant polymer was cooled down to room temperature and stored with exclusion of moisture. It contained about 10% by weight of plasticizer (diisodecyl phthalate), was clear and had a viscosity the day after production of 79 Pas at 20° C.

Polymer R-2: (Comparative)

To an initial charge of 333.3 g of polymer C-1, prepared as described above, under a nitrogen atmosphere with exclusion of moisture were added 13.6 g of silane A-3 and 0.06 g of Bi catalyst (Coscat® 83, from Vertellus), and the mixture was stirred at 80° C. until no isocyanate groups were detectable any longer by means of FT-IR spectroscopy. The resultant polymer was cooled down to room temperature and stored with exclusion of moisture. It contained 10% by weight of plasticizer (diisodecyl phthalate), was clear and had a viscosity the day after production of 113 Pas at 20° C.

Polymer SPUR-1: (Comparative)

190.0 g of Desmophen® 5031 BT and 19.5 g of 3-isocyanatopropyltrimethoxysilane were converted by a known method at 80° C. to a polymer containing silane groups. The resultant polymer was cooled down to room temperature and stored with exclusion of moisture. It was clear and had a viscosity the day after production of 5 Pas at 20° C.

TABLE 1

Overview of the polymers containing silane groups prepared

| Polymer | | Polyol | Diisocyanate | NCO/OH | Distilled? | Silane | Plasticizer | Viscosity [Pa · s] |
|---|---|---|---|---|---|---|---|---|
| S-1 | inv.[1] | Diol 10 mg KOH/g | IPDI | 10/1 | yes | A-2 | no | 40 |
| S-2 | inv.[1] | Diol 10 mg KOH/g | IPDI | 10/1 | yes | A-3 | no | 90 |
| S-3 | inv.[1] | Triol 28 mg KOH/g | 4,4'-MDI | 6/1 | yes | A-1 | no | 357 |
| S-4 | inv.[1] | Triol 28 mg KOH/g | IPDI | 5/1 | yes | A-1 | no | 70 |
| S-5 | inv.[1] | Diol 28 mg KOH/g | 4,4'-MDI | 6/1 | yes | A-1 | no | 108 |
| R-O | ref.[2] | Diol 10 mg KOH/g | IPDI | 2.1/1 | no | A-1 | 10% | 99 |
| R-1 | ref.[2] | Diol 10 mg KOH/g | IPDI | 2.1/1 | no | A-2 | 10% | 79 |
| R-2 | ref.[2] | Diol 10 mg KOH/g | IPDI | 2.1/1 | no | A-3 | 10% | 113 |
| SPUR-1 | ref.[2] | Triol 28 mg KOH/g | — | — | — | NCO silane | no | 5 |

[1] inventive
[2] comparative

Moisture-Curing Compositions

Compositions Z1 to Z12

For each composition, the ingredients specified in tables 2 to 3 were mixed in the amounts specified (in parts by weight) by means of a centrifugal mixer (SpeedMixer™ DAC 150, FlackTek Inc.) with exclusion of moisture at 3000 rpm for one minute and stored with exclusion of moisture.

The compositions were tested as follows:

As a measure of storage stability, viscosity was measured after storage with exclusion of moisture in a closed aluminum tube at room temperature after one day (1d RT) and in an air circulation oven at 60° C. after 7 days (7d 60° C.).

As a measure of the open time, skin time (ST) was determined. For this purpose, a few grams of the composition was applied to cardboard in a layer thickness of about 2 mm and, under standard climatic conditions, the period of time after which no residues remained any longer on an LDPE pipette used to gently tap the surface of the composition was determined.

As a measure of hardness and heat stability, Shore A hardness was determined to DIN 53505, on test specimens cured under standard climatic conditions for 7 days (7d SCC), or on test specimens stored under standard climatic conditions for 7 days and then for the specified period at the specified temperature in an air circulation oven at 80° C., 90° C. or 100° C.

To determine the mechanical properties, the composition was applied to a silicone-coated release paper to give a film of thickness 2 mm, the film was stored under standard climatic conditions for 14 days, and a few dumbbells having a length of 75 mm with a bar length of 30 mm and a bar width of 4 mm were punched out of the film and these were tested in accordance with DIN EN 53504 at a strain rate of 200 mm/min for Tensile strength (breaking force), Elongation at break and MoE 5% (at 0.5%-5% elongation) and MoE 50% (at 0.5%-50% elongation).

As a measure of the strength of an adhesive bond, lap shear strength (LSS) was determined on glass. For this purpose, bonded test specimens were produced by bonding two glass plates that had been degreased with isopropanol and pretreated with Sika® Aktivator 205 (from Sika Schweiz AG) in such a way that the overlapping adhesive bond had dimensions of 12×25 mm and a thickness of 4 mm and the glass plates protruded at the top ends. After a storage time of 14 days under standard climatic conditions, lap shear strength was determined to DIN EN 1465 at a strain rate of 20 mm/min.

The results are reported in tables 2 to 3.

Comparative examples are identified by (Ref.).

TABLE 2

Composition (in parts by weight) and properties of Z1 to Z6.

| Composition | Z1 | Z2 (Ref.) | Z3 | Z4 (Ref.) | Z5 | Z6 (Ref.) |
|---|---|---|---|---|---|---|
| Polymer S-1 | 53.0 | — | — | — | — | — |
| Polymer S-2 | — | — | 53.0 | — | 82.3 | — |
| Polymer R-1 | — | 58.8 | — | — | — | — |
| Polymer R-2 | — | — | — | 58.8 | — | 91.4 |
| Diisodecyl phthalate | 14.9 | 9.1 | 14.9 | 9.1 | — | — |
| Precipitated coated chalk[1] | 7.8 | 7.8 | 7.8 | 7.8 | — | — |
| Carbon black | 18.3 | 18.3 | 18.3 | 18.3 | — | — |
| Fumed silica | 2.0 | 2.0 | 2.0 | 2.0 | — | — |
| Amine[2] | 0.5 | 0.5 | 0.5 | 0.5 | — | — |
| AMEO[3] | 1.0 | 1.0 | 1.0 | 1.0 | 4.0 | 4.0 |
| VTEO[4] | 1.0 | 1.0 | 1.0 | 1.0 | 4.0 | 4.0 |
| DBU[5] | 0.5 | 0.5 | 0.5 | 0.5 | 0.6 | 0.6 |
| Stabilizers | 1.0 | 1.0 | 1.0 | 1.0 | — | — |
| Viscosity @ 20° C. [Pa·s] 1 d RT | n.d. | n.d. | n.d. | n.d. | 20.2 | 26.3 |
| 7 d 60° C. | | | | | 22.2 | 26.8 |
| ST [min] | 50 | 85 | 40 | 95 | 75 | 100 |
| 1 d RT | n.d. | n.d. | n.d. | n.d. | 85 | 105 |
| 7 d 60° C. | | | | | | |
| Shore A 7 d SCC | 66 | 53 | 60 | 55 | 37 | 39 |
| +7 d 90° C. | n.d. | n.d. | n.d. | n.d. | 26 | 23 |
| LSS [MPa] | n.d. | n.d. | 4.5 | 3.7 | n.d. | n.d. |
| Tensile strength [MPa] | 5.9 | 5.6 | 5.6 | 5.5 | n.d. | n.d. |
| Elongation at break [%] | 280 | 450 | 290 | 350 | n.d. | n.d. |
| MoE 5% [MPa] | 5.9 | 3.7 | 4.0 | 3.5 | n.d. | n.d. |
| MoE 50% [MPa] | 2.9 | 1.7 | 2.2 | 1.8 | | |

"n.d." stands for "not determined"
[1] Socal U1S2 (from Solvay)
[2] Jeffamine T-403 (from Huntsman)
[3] 3-aminopropyltriethoxysilane
[4] vinyltriethoxysilane
[5] 1,8-diazabicyclo[5.4.0]undec-7-ene

TABLE 3

Composition (in parts by weight) and properties of Z7 to Z12.

| Composition | Z7 (Ref.) | Z8 | Z9 | Z10 | Z11 (Ref.) | Z12 |
|---|---|---|---|---|---|---|
| Polymer R-0 | 50.0 | 40.0 | 40.0 | 40.0 | 40.0 | — |
| Polymer S-3 | — | 10.0 | — | — | — | — |
| Polymer S-4 | — | — | 10.0 | — | — | 50.0 |
| Polymer S-5 | — | — | — | 10.0 | — | — |
| Polymer SPUR-1 | — | — | — | — | 10.0 | — |
| AMMO[1] | 1.0 | 1.0 | 1.0 | 1.0 | 1.0 | 1.0 |
| VTMO[2] | 1.0 | 1.0 | 1.0 | 1.0 | 1.0 | 1.0 |
| DBU[3] | 0.1 | 0.1 | 0.1 | 0.1 | 0.1 | 0.1 |
| DBTDL[4] | 0.05 | 0.05 | 0.05 | 0.05 | 0.05 | 0.05 |
| Viscosity @ 20° C. [Pa·s] 1 d RT | 66 | 76 | 32 | 32 | 43 | 30 |
| 7 d 60° C. | 52 | 78 | 32 | 37 | 38 | 32 |
| ST [min] 1 d RT | 13 | 13 | 27 | 28 | 13 | 22 |
| 7 d 60° C. | 20 | 40 | 30 | 32 | 20 | 25 |
| Shore A 7 d SCC | 35 | 40 | 38 | 38 | 39 | 54 |
| +7 d 80° C. | 33 | 39 | 37 | 36 | 36 | 55 |
| +14 d 80° C. | 31 | 35 | 34 | 35 | 34 | 54 |
| +7 d 90° C. | 29 | 31 | 31 | 33 | 26 | 51 |
| +14 d 90° C. | n.m. | 17 | 20 | 27 | n.m. | 48 |
| +7 d 100° C. | n.m. | 17 | 21 | 26 | n.m. | 47 |
| Tensile strength [MPa] | 0.59 | 1.01 | 0.63 | 0.61 | 0.68 | 0.72 |
| Elongation at break [%] | 72 | 125 | 63 | 65 | 72 | 30 |
| MoE 5% [MPa] | 1.12 | 1.50 | 1.32 | 1.29 | 1.30 | 2.69 |

"n.m." means "not measurable", since too soft (destroyed)
[1] 3-aminopropyltrimethoxysilane
[2] vinyltrimethoxysilane
[3] 1,8-diazabicyclo[5.4.0]undec-7-ene
[4] dibutyltin dilaurate It is apparent from table 3 that the inventive compositions Z8 to Z10 and Z12 have good thermal stability, while comparative compositions Z7 and Z11 have inadequate thermal stability. After storage at 90° C. for 14 days and at 100° C. for 7 days, the Shore A test specimens thereof have been destroyed to such an extent that no measurement was possible.

Two-Component Compositions Comprising an Epoxy Resin

Compositions Z13 and Z14

For each composition, a first component 1 was produced by mixing 62.2 parts by weight (PW) of the polymer containing silane groups as specified in table 4, 1.4 PW of diisodecyl phthalate, 2.4 PW of vinyltrimethoxysilane, 27.4 PW of 1,2-diaminocyclohexane (Dytek® DCH-99, from Invista), 2.3 PW of 3-aminopropyltrimethoxysilane, 2.3 PW of 2,4,6-tris(dimethylaminomethyl)phenol (Ancamine® K54, from Evonik), 0.4 PW of stabilizer (Irganox 1010, from BASF), 1.5 PW of carbon black and 0.1 PW of dibutyltin dilaurate by means of a centrifugal mixer (Speed-Mixer™ DAC 150, FlackTek Inc.), and the mixture was stored with exclusion of moisture.

Additionally produced for each composition was a second component 2, by processing 70.2 PW of bisphenol A diglycidyl ether (Araldite® GY 250, from Huntsman), 23.4 PW of hexanediol diglycidyl ether (Araldite® DY-H, from Huntsman), 0.5 PW of emulsifier, 1.9 PW of water, 2.4 PW of fumed silica, 1.5 PW of carbon black and 0.1 PW of dibutyltin dilaurate by means of the centrifugal mixer, and storage of the mixture.

The two components were then processed in a weight ratio of 0.6/1 first/second component using the centrifugal mixer to give a homogeneous liquid, and this was tested immediately as follows:

For determination of the mechanical properties, the mixed composition was poured onto a PTFE-coated film to give a film of thickness 2 mm and stored under standard climatic conditions. After 1 day, a number of dumbbell-shaped test specimens having a length of 75 mm with a bar length of 30 mm and a bar width of 4 mm were punched out of the film and stored under standard climatic conditions for a further 6 days. Subsequently, these, as described in DIN EN 53504, at a strain rate of 2 mm/min, tensile strength (breaking force), elongation at break and modulus of elasticity at 0.5% to 1% elongation (MoE 0.5-1%) and at 0.5% to 5% elongation (MoE 0.5-5%) were determined. Similarly, a number of test specimens were punched out and stored for determination of tear resistance and were tested in accordance with DIN ISO 34 at a strain rate of 500 mm/min.

After 7 days under SC, the appearance of all the films was rated visually. All films were black in color after curing, have absolutely zero tack with a silky matt surface, and were homogeneous and free of blisters. Such films were referred to as "nice". These results are reported in table 4.

TABLE 4

Polymer containing silane groups and properties of compositions Z-13 and Z-14.

| Composition | Z-13 | Z-14 |
|---|---|---|
| Polymer in component 1 | S-4 | S-5 |
| Tensile strength [MPa] | 20.3 | 22.7 |
| Elongation at break | 46% | 60% |
| MoE 0.5-1% [MPa] | 890 | 1015 |
| MoE 0.5-5% [MPa] | 329 | 334 |
| Tear resistance [N/mm] | 30.8 | 26.6 |
| Appearance | nice | nice |

Compositions Z-13 and Z-14, in the tensile test according to DIN EN 53504, show deformation having a low level of elasticity but mainly plasticity. They are especially suitable as structural adhesive for cohesive bonding of substrates or as encapsulating compound of high hardness and toughness.

The invention claimed is:

1. A polymer containing silane groups from the reaction of
   (i) a polymer containing isocyanate groups and having an NCO content in the range from 0.3% to 4% by weight and a monomeric diisocyanate content of not more than 0.3% by weight, obtained from the reaction of at least one monomeric diisocyanate with at least one polyether polyol in a molar NCO/OH ratio ranging from 5/1 to 13/1, and subsequent removal of a majority of the unconverted monomeric diisocyanates by means of a suitable separation method, and
   (ii) with at least one amino-, mercapto- or hydroxysilane in a stoichiometric ratio of at least 1 mol of amino-, mercapto- or hydroxysilane per molar equivalent of isocyanate groups.

2. The polymer containing silane groups as claimed in claim 1, wherein the polymer has silane groups of the formula (I)

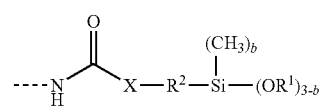

where
b is 0, 1 or 2,
$R^1$ is an alkyl radical optionally containing ether groups and having 1 to 10 carbon atoms,
$R^2$ is a divalent hydrocarbyl radical having 1 to 12 carbon atoms that optionally has cyclic and/or aromatic moieties and optionally one or more heteroatoms, and
X is O, S or $NR^3$ where $R^3$ is H or a monovalent hydrocarbyl radical having 1 to 20 carbon atoms that optionally has heteroatoms in the form of alkoxysilyl, ether or carboxylic ester groups.

3. The polymer containing silane groups as claimed in claim 1, wherein the polymer has an average of 1.3 to 4 silane groups per molecule.

4. The polymer containing silane groups as claimed claim 1, wherein the monomeric diisocyanate is selected from the group consisting of diphenylmethane 4,4'-diisocyanate, with or without fractions of diphenylmethane 2,4'- and/or 2,2'-diisocyanate, tolylene 2,4-diisocyanate, mixtures of tolylene 2,4-diisocyanate with tolylene 2,6-diisocyanate, hexane 1,6-diisocyanate and 1-isocyanato-3,3,5-trimethyl-5-isocyanatomethylcyclohexane.

5. The polymer containing silane groups as claimed in claim 1, wherein the monomeric diisocyanate is diphenylmethane 4,4'-diisocyanate.

6. The polymer containing silane groups as claimed in claim 1, wherein the polyether polyol, based on all repeat units, has 80% to 100% by weight of 1,2-propyleneoxy groups and 0% to 20% by weight of 1,2-ethyleneoxy groups.

7. The polymer containing silane groups as claimed in claim 1, wherein the polyether polyol has an OH number in the range from 5 to 58 mg KOH/g.

8. The polymer containing silane groups as claimed in claim 1, wherein the polyether polyol is a polyether diol having an average OH functionality in the range from 1.7 to 2.

9. The polymer containing silane groups as claimed in claim 1, wherein the polyether polyol is a polyether triol having an average OH functionality in the range from 2.2 to 3.

10. A process for preparing a polymer containing silane groups as claimed in claim 1, wherein
   (a) at least one monomeric diisocyanate is reacted with at least one polyether polyol having an OH number in the range from 5 to 58 mg KOH/g in a molar NCO/OH ratio of ranging from 5/1 to 13/1,
   (b) then a majority of unconverted monomeric diisocyanate is removed by means of a suitable separation method,
   (c) and the polymer containing isocyanate groups obtained is finally reacted with at least one amino-, mercapto- or hydroxysilane in a stoichiometric ratio of at least 1 mol of amino-, mercapto- or hydroxysilane per molar equivalent of isocyanate groups.

11. A curable composition comprising at least one polymer containing silane groups as claimed in claim 1 and at least one further constituent selected from the group consisting of catalysts, crosslinkers, adhesion promoters, desiccants, plasticizers and fillers.

12. The curable composition as claimed in claim 11, wherein the curable composition comprises at least one polymer containing silane groups derived from a polyether triol, and at least one further polymer containing silane groups.

13. The curable composition as claimed in claim 11, wherein the curable composition is used as elastic adhesive or elastic sealant or elastic coating.

14. The curable composition as claimed in claim 11, wherein the curable composition additionally comprises at least one epoxy resin.

15. A cured composition obtained from the curable composition as claimed in claim 11 after contact thereof with moisture.

* * * * *